(12) United States Patent
Park et al.

(10) Patent No.: US 9,165,242 B2
(45) Date of Patent: Oct. 20, 2015

(54) SYNAPTIC SEMICONDUCTOR DEVICE AND OPERATION METHOD THEREOF

(71) Applicant: Seoul National University R&DB FOUNDATION, Seoul (KR)

(72) Inventors: Byung-Gook Park, Seoul (KR); Hyungjin Kim, Seoul (KR); Garam Kim, Seoul (KR); Jung Han Lee, Ansan-si (KR); Min-Woo Kwon, Seoul (KP)

(73) Assignee: SEOUL NATIONAL UNIVERSITY R&DB FOUNDATION (KR)

( * ) Notice: Subject to any disclaimer, the term of this patent is extended or adjusted under 35 U.S.C. 154(b) by 232 days.

(21) Appl. No.: 14/018,693

(22) Filed: Sep. 5, 2013

(65) Prior Publication Data

US 2014/0067743 A1      Mar. 6, 2014

(30) Foreign Application Priority Data

Sep. 6, 2012   (KR) .................... 10-2012-0098767

(51) Int. Cl.
*G06F 15/18* (2006.01)
*G06N 3/00* (2006.01)
*G06J 1/00* (2006.01)
*G06N 3/02* (2006.01)
*G06N 3/04* (2006.01)
*G06N 3/063* (2006.01)

(52) U.S. Cl.
CPC .............. *G06N 3/02* (2013.01); *G06N 3/049* (2013.01); *G06N 3/063* (2013.01)

(58) Field of Classification Search
None
See application file for complete search history.

(56) References Cited

U.S. PATENT DOCUMENTS

| | | | |
|---|---|---|---|
| 5,343,081 A | * | 8/1994 | Nakamura ................ 706/33 |
| 2012/0084241 A1 | | 4/2012 | Friedman et al. |
| 2014/0067743 A1 | * | 3/2014 | Park et al. ................ 706/33 |

OTHER PUBLICATIONS

Hebbian Learning in Spiking Neural Networks With Nanocrystalline Silicon TFTs and Memristive Synapses Cantley, K.D.; Subramaniam, A.; Stiegler, H.J.; Chapman, R.A.; Vogel, Eric M. Nanotechnology, IEEE Transactions on Year: 2011, vol. 10, Issue: 5 pp. 1066-1073, DOI: 10.1109/TNANO.2011.2105887.*

Pulse-Type Hardware Inhibitory Neural Networks for MEMS micro robot using CMOS technology, Saito, K.; Okazaki, K.; Sakata, K.; Ogiwara, T.; Sekine, Y.; Uchikoba, F. Neural Networks (IJCNN), The 2011 International Joint Conference on Year: 2011 pp. 1606-1611, DOI: 10.1109/IJCNN.2011.6033416.*

Complementary oxide memristor technology facilitating both inhibitory and excitatory synapses for potential neuromorphic computing applications Alan Doolittle, W.; Calley, W.L.; Henderson, W. Semiconductor Device Research Symposium, 2009. ISDRS '09. International Year: 2009 pp. 1-2, DOI: 10.1109/ISDRS.2009.5378162.*

(Continued)

*Primary Examiner* — Michael B Holmes
(74) *Attorney, Agent, or Firm* — Cantor Colburn LLP

(57) ABSTRACT

Disclosed is a semiconductor device used to embody a neuromorphic computation system and operation method thereof. By comprising a floating body as a short-term memory means electrically isolated from the surroundings and a long-term memory means formed at one side of the floating body not formed of a source, a drain and a gate, a low power synaptic semiconductor device is provided, which can be mimic not only the short-term memory in a nervous system of a living body by an impact ionization, but also the short- and long-term memory transition property and the causal inference property of a living body due to the time difference of signals of the pre- and post-synaptic neurons.

31 Claims, 13 Drawing Sheets

(56) References Cited

OTHER PUBLICATIONS

Neuromorphic Hardware System for Visual Pattern Recognition With Memristor Array and CMOS Neuron Myonglae Chu; Byoungho Kim; Sangsu Park; Hyunsang Hwang; Moongu Jeon; Byoung Hun Lee; Byung-Geun Lee Industrial Electronics, IEEE Transactions on Year: 2015, vol. 62, Issue: 4 pp. 2410-2419, DOI: 10.1109/TIE.2014.2356439.*

Eric R. Kandel, In search of Memeory, 2006, pp. 261-276, W.W. Norton & Company Ltd.

S. H. Jo et al., Nanoscale Memristor Device as Synapse in Neuromorphic Systems, 2010, pp. 1297-1301, NANO Letters.

D. Kuzum et al., Energy Efficient Programming of Nanoelectronic Synaptic Devices for Large-Scale Implementation of Associative and Temporal Sequence Learning, 2011, pp. 693-696, IEDM.

* cited by examiner

SYNAPTIC SEMICONDUCTOR DEVICE AND OPERATION METHOD THEREOF

CROSS-REFERENCE TO RELATED APPLICATION

This application claims priority to Korean Patent Application No. 10-2012-0098767, filed on Sep. 6, 2012, under 35 U.S.C. 119, the entire contents of which are hereby incorporated by reference.

BACKGROUND OF INVENTION

1. Field of the Invention

The present invention relates to a semiconductor device and operation method thereof, and more particularly to a synaptic semiconductor device and operation method thereof.

2. Description of the Related Art

The nervous system of a living body is consisted of numerous nerve cell neurons and synapses connecting neurons. Synapses may be classified as electrical or chemical, based on the signal transmission between neurons. The electrical synapses are found in invertebrates and myocardial cells etc. Since the others are known as the chemical synapses, hereinafter, word of "synapse(s)" indicates the chemical synapse(s).

Recently, many studies have been made to mimic the nervous system of a living body, in particular the brain nervous system, by a nerve-like circuit system (i.e., a neuromorphic computation system) using semiconductor devices.

By the way, in order to embody the neuromorphic computation system, the following properties of the nervous system of a living body must be considered.

First, a short-term memory is biologically formed of synaptic connections or a potentiation of the synaptic connections and a long-term memory is composed of the growth of new synapses etc. in the stimulated place through gene expression in the nucleus of a neuron by repetitive stimulation. This content refers to pp. 293-308 of a Korean translated book of 'In Search of Memory' by Eric R. Kandel, which is translated by Deaho Jeon and published by Random House Korea Inc. in 2011 (Reference 1). FIGS. 1 and 2 are redrawn from Reference 1.

In order to analyze a transition mechanism from a short-term memory to a long-term memory, Kandel, the original author of Reference 1, performed the experiment of learning (memory) of stimulation in Aplysia which has relatively a simple nervous system and obtained the results as shown in FIG. 1.

FIG. 1 is a simple drawing of a nervous system of Aplysia. According to (a) in FIG. 1, an external stimulation impacted on a tail 1 activates an interneuron releasing serotonin and the interneuron is connected to a sensory neuron connected to a siphon 2 and a motor neuron controlling a shrinking reflection of a gill 3, respectively.

In FIG. 1, (b) is an enlarged view of a part A in (a) for explaining a short-term memory mechanism when a single stimulation is applied. The neurotransmitter serotonin released from an interneuron is binding to a receptor of a sensory neuron and induces the increase of cyclic AMP and protein kinase A in the sensory neuron. Subsequently, vesicles having the neurotransmitter at the axon terminal of the sensory neuron are moved to a plasma membrane and burst to transmit the stimulated signal to the motor neuron. As a result, the stimulation remains in the short-term memory.

On the other hand, (c) in FIG. 1 is drawn to explain the mechanism of a long-term memory when repetitive stimulation is applied 5 times. The repetitive stimulation induces the repetitive release of serotonin from the interneuron. The released serotonin increases the amount of cyclic AMP in the sensory neuron, and then protein kinase A and MAP kinase move into the nucleus to activate CREB-1 and inactivate CREB-2 respectively for gene expression. Subsequently, the repetitive stimulation remains in the long-term memory through the change of cell functions or structures such as the growth of new synapses etc.

Thus, when the regular stimulation is repeatedly applied to a living body, according to the increase of cyclic AMP in a neuron, the short-term memory is transited to the long-term memory through the change of functions or structures of a synapse by gene expression in the nucleus of a neuron.

Additionally, as shown in FIG. 2, Kandel, the original author of Reference 1, insisted that in a cell culture system having a single sensory neuron connected to two motor neurons via two synapses, the gene expression in the nucleus only affect the single synapse receiving 5 times of serotonin injection (5 times of stimulation) for the growth of new synaptic terminals etc.

The author, as shown in the enlarged view of FIG. 2, explains the reasons that (1) the mRNA synthesized by the repetitive stimulation in the nucleus of a sensory neuron is delivered to all axon terminals in a resting state, (2) serotonin injected 5 times in a single terminal changes the recessive CPEB (Cyto-plasmic Polyadenylation Element Binding protein: the protein with the self-perpetuation as like as the prion) being in a recessive state in all terminals into the dominant CPEB, (3) the dominant CPEB changes the recessive CPEB into the dominant one, and (4) the dominant CPEB meets and activates the mRNA moving into each axon terminal and then the activated mRNA synthesizes the proteins for changing the structure such as a new synaptic terminal growth etc. Consequently, the portion of the stimulated synapse is transited to the long-term memory.

Additionally, in order to embody the neuromorphic computation system, another important property of the nervous system of a living body has to be considered. It is a Spike-Timing Dependent Plasticity (STDP) that the synaptic connectivity is dependent on the fire time difference between pre- and post-synaptic neurons.

According to FIG. 3, each neuron 100, 200 or 300 has basically a nucleus 110 in a cell body (a soma), and there are a plurality of dendrites 120 to receive a stimulated signal around the cell body and an axon 130 connected by an axon hillock 122 to transmit the stimulated signal to one side of the cell body.

The axon 130 generally has a length of about 10,000 times of diameter of the cell body, is wrapped with a plurality of myelin sheaths 132 interlaid with a node of Ranvier 134 and consists of axon collaterals 136 and axon terminals 138.

A synapse 400, as an enlarged view shown in FIG. 3, indicates a connecting region between two neurons, namely, a meeting region between an axon terminal of the pre-synaptic neuron 200 and a dendrite of the post-synaptic neuron 100 interlaid with the narrow space, as a synaptic cleft 402, of about 20 nm.

The transmission process of the synapse 400 is simply described as the followings with respected to the enlarged view shown in FIG. 3.

First, when a fire is triggered by a stimulation exceeded over the threshold (Vth, an about −55 mV) in the pre-synaptic neuron 200, the stimulation as an electrical signal is transmitted to the axon terminal through the axon with the repeat of depolarization and repolarization by alternately opening and closing sodium 202 and potassium (not shown) channels, respectively.

The stimulation transmitted to the axon terminal of the pre-synaptic neuron 200 opens a calcium channel 204 and allows an influx of $Ca^{2+}$ ions into the plasma membrane through the calcium channel. The intracellular $Ca^{2+}$ ions bind to vesicles 206 filled up the neurotransmitters 208 and cause the vesicles 206 to fuse into the plasma membrane for releasing the internal neurotransmitters 208 into the synaptic cleft 402. The released neurotransmitters 208 diffuse to flow across the synaptic cleft 402 and arrive at dendrite membranes of the post-synaptic neuron 100.

Here, the neurotransmitters 208 enable the stimulation transmitted from the pre-synaptic neuron 200 through two kinds of channels to chemically transmit into the post-synaptic neuron 100.

Exactly, one is a ligand-gated ion channel that uses the diffused neurotransmitter 208 as a ligand which directly binds to the ion channel. Namely, if the neurotransmitter 208 binds to Na+ channel 102, Na+ ion flows into the post-synaptic neuron 100 for contributing towards excitation and if the neurotransmitter 208 binds to K+ channel 104, K+ ion flows out of the post-synaptic neuron 100 for suppressing excitation.

The other is a G-protein coupled receptor 106 mediated ion channel that is activated by the diffused neurotransmitter 208 which directly binds to the G-protein coupled receptor 106 on the plasma membrane of a dendrite in the post-synaptic neuron 100. In this time, an alpha subunit of the G-protein coupled receptor 106 is dissociated and directly couples to the ion channel or indirectly couples to an effecter 108 on the inner membrane for operating this ion channel through an intracellular second messenger (not shown). In other words, if the second messenger couples to a Na+ gate 102, Na+ ion flows into the post-synaptic neuron 100 for contributing towards the excitation and if the second messenger couples to a K+ gate 104, K+ ion flows out from the post-synaptic neuron 100 for suppressing the excitation.

The intracellular Na+ ions flow in the dendrite membrane of the post-synaptic neuron 100 through the Na+ channels 102, diffuse across the cell body and then collect at the axon hillock 122. When the sum of the intracellular Na+ ions and the ions transmitted from other dendrites 120 induces the depolarization by more than the threshold membrane potential (Vth) at the axon hillock 122, a fire is produced as a spike signal shown in FIG. 4. The spike signal is an electrical signal for transmission of the stimulation by again repeating the depolarization and the repolarization along the axon 130 of the post-synaptic neuron 100.

In FIG. 3, the stimulation is transmitted from the pre-synaptic neuron 300 to two different dendrites 120 of the post-synaptic neuron 100 through two different synapses by two signals (a) and (b), respectively and can be fired when the sum (a+b) of two signals (a) and (b) is exceeded over the threshold (Vth) at the axon hillock 122 of the post-synaptic neuron.

In FIG. 4, when the membrane potential reaches the threshold (Vth, −55 mV) at the point ①, the membrane of the axon 130 of the post-synaptic neuron 100 opens the Na+ channels, which allow Na+ ion inflow to produce a fire by a sudden membrane potential rising and then, at the point ②, closes the Na+ channels and simultaneously opens the K+ channels, which allow K+ ion outflow to reduce the membrane potential until the K+ channels are closed at about −80 mV, and then maintains −70 mV of the resting (equilibrium) membrane potential by operations of Na+ pumps and K+ pumps.

By the above mentioned reasons, the first fire is mainly generated at the axon hillock 122 of the post-synaptic neuron 100 and the Na+ ions entered by the first fire are rapidly diffused by the myelin sheath 132 to depolarize the neighbor axon membrane. As a result, the spike waveform as shown in FIG. 4 is transmitted to the axon terminal.

Thus, as shown in FIG. 3, since a single neuron is connected to two or more neurons through the different synapses in the real nervous system of a living body, in order to embody a neuromorphic computation system, it is important element that consideration of different fire times between pre- and post-neurons of a predetermined synapse. In other words, as shown in FIG. 3, when a fire is generated at an axon hillock 122 of a neuron 100, it is considered that the synaptic connectivity is potentiated in the synapses connected to a pre-fired neuron 200 or 300 and the synaptic connectivity is depressed in the other synapses.

Among prior research results to mimic the nervous system of a living body by considering the above mentioned properties, there are S. H. Jo, et al., Nanoscale Memristor Device as Synapse in Neuromorphic Systems, Nano Letters 10 (4), pp. 1297-1301, 2010 (hereinafter, Reference 2) and D. Kuzum, et al., Energy Efficient Programming of Nanoelectronic Synaptic Devices for Large-Scale Implementation of Associative and Temporal Sequence Learning, IEEE International Electron Devices Meeting, pp. 693-696, 2011 (hereinafter, Reference 3).

However, References 2 and 3 are intended to mimic the synapse by a memristor based device using a resistive switching material and a phase change material, respectively. These can mimic the long-term memory and the properties of the synaptic connections which are potentiated or depressed by the applying time differences of the pre- and post-synaptic signals. But, these cannot mimic the short-term memory that the stored information is naturally deleted within a short time period when the input signal temporarily disappears. Subsequently, these have a problem that the short-long term memory transition cannot be embodied.

And U.S Publication No. 2012/0084241A1 (hereinafter, Reference 4) is disclosed for techniques to mimic STDP properties that the synaptic connectivity connecting two neurons is changing by the spike time differences between pre- and post-synaptic neurons by using the phase change material as a synaptic device applied to the neuromorphic computation system. As like as References 2 and 3, since it uses the property of the phase change material, it cannot embody the property of the short-term memory of the biological synapse. Subsequently, it also has a problem that the short- and long-term memory transition cannot be embodied.

SUMMARY OF THE INVENTION

The present invention is directed to solve the problems of the conventional techniques and to provide a synaptic semiconductor device which can mimic not only a short-term memory, but also a short- and long-term memory transition property and a causal inference property of a living body by the time difference of pre- and post-synaptic signals and operation method thereof.

To achieve the objective, To achieve the objective, a synaptic semiconductor device according to the present invention comprises: a floating body as a short-term memory means formed of a first conductivity type semiconductor material and electrically isolated from the surroundings; a source and a drain formed of a second conductivity type semiconductor material opposite to the first conductivity type on both sides of the floating body with being separated from each other; a gate formed of a conductive material on a gate insulating layer formed on the floating body; and a long-term memory means formed at one side of the floating body not formed of the source, drain and gate.

Here, the long-term memory means can be formed at an opposite side to the gate being interlaid with the floating body. To be more specific, the long-term memory means can have a floating gate or an electro-mechanical memory device structure etc. The floating gate structure includes an insulating layer formed on the one side of the floating body and a floating gate formed on the insulating layer. Especially, in the floating gate structure the floating gate can be formed at a lower portion of the floating body, the insulating layer can be formed to wrap around the floating gate, and a back gate can be further formed on the insulating layer at a lower portion of the floating gate. On the other hand, the electro-mechanical memory device structure includes a cantilever beam and a contact electrode electrically connected to one and the other of the source and drain respectively and spaced apart from each other over the floating body.

The floating body has pn junctions with the source and drain and can be operated to mimic a short-term memory by storing excess holes generated by an impact ionization in a depletion layer of the pn junction at the side of the drain or excess electrons generated by an impact ionization in a depletion layer of the pn junction at the side of the source and by disappearance of the excess holes or electrons by a recombination. Also the floating body can be operated to shift to a long-term memory by inflow of excess holes or electrons generated by an additional impact ionization to further reduce the conduction band or raise the valance band before the disappearance of the excess holes or electrons by a recombination and by allowing that the impact ionization is generated near to the long-term memory means.

The long-term memory means includes an insulating layer formed on the one side of the floating body and a floating gate formed on the insulating layer, and the long-term memory can occur by injection of hot holes or electrons generated by an additional impact ionization into the floating gate when the additional impact ionization is generated near to the long-term memory means. Also the long-term memory means can be operated to mimic a causal inference property of a living body by the hot carriers injected into the floating gate due to the time difference between the electrical signals independently applied to the source and drain, respectively.

In the case that the long-term memory means has the electro-mechanical memory device structure, a cantilever beam and a contact electrode are electrically connected to one and the other of the source and drain, respectively and spaced apart from each other at one side of the floating body.

In the electro-mechanical memory device structure, the floating body has pn junctions with the source and drain and can be operated to mimic a short-term memory by storing excess holes generated by an impact ionization in a depletion layer of the pn junction at the side of the drain or excess electrons generated by an impact ionization in a depletion layer of the pn junction at the side of the source and by disappearance of the excess holes or electrons by a recombination.

Additionally, in the electro-mechanical memory device structure, the floating body can be operated to shift to a long-term memory by inflow of excess holes or electrons generated by an additional impact ionization to curve the cantilever beam for electrically contacting to the contact electrode over a predetermined concentration before the disappearance of the excess holes or electrons by a recombination.

On the other hand, an operation method of a synaptic semiconductor device according to the present invention comprises: operating a short-term memory by storing excess holes or electrons generated by an impact ionization in the floating body when predetermined bias voltages being applied to the source, drain, gate and back gate, respectively, operating a transition of a long-term memory by injecting hot holes or electrons into the floating gate when the bias voltages being applied to the source, drain, gate and back gate more than twice with a time regular interval under the same bias condition before disappearance of the excess holes or electrons by a recombination, and operating a mimicry of a causal inference property of a living body by the types of carriers injected into the floating gate according to the time difference between the electrical signals independently applied to the source and drain, respectively.

Here, the operation of the transition of the long-term memory can be performed by the different duration of each of the bias voltages applied to the source and drain according to the size of voltage applied to the gate, or by equally maintaining the difference and the duration of the bias voltages applied to the source and drain and by changing the number of times according to the period.

Additionally, it is preferred that the bias voltages applied to the source, drain, gate and back gate are triangle spike waveforms having all the same period.

Here, the triangle spike waveforms applied to the source, drain and back gate can have all the same size, and the triangle spike waveform applied to the gate can be increased or decreased according to the time and be reversed to the triangle spike waveform applied to the back gate.

Especially, the triangle spike waveform applied to the source can be a pre-synaptic spike, and the triangle spike waveform applied to the drain can be a post-synaptic spike; the pre- and post-synaptic spikes is to operate for transition from the short-term memory to the long-term memory through a predetermined repeat with a predetermined duration and a predetermined period; and the mimicry of the causal inference property of a living body can be operated by the potentiation (i.e., facilitation) or the depression (i.e., inhibition) of the synaptic connectivity using a delay time between the pre- and post-synaptic spikes.

In short, the present invention provides a low power synaptic semiconductor device that can mimic not only the short-term memory in a nervous system of a living body, but also the short- and long-term memory transition property and the causal inference property of a living body due to the time difference of signals of the pre- and post-synaptic neurons and be used as a core device to embody a neuromorphic computation system.

BRIEF DESCRIPTION OF THE DRAWINGS

FIG. 12A is in the case of a time interval (period Ti=1 ms) after the excess holes stored in the floating body disappearing by a recombination, and reversely, FIGS. 12B and 12C are in the case of a time interval (period) Ti=0.1 ms and Ti=0.01 ms, respectively before the excess holes stored in the floating body disappearing by a recombination.

In these drawings, the following reference numbers are used throughout: reference number 10 indicates a source, 20 a drain, 22 a contact electrode, 30 a gate, 32 a gate insulating layer, 40 a floating body, 50 an excess hole, 60 a long-term memory means, 62 and 64 an insulating layer, 66 a floating gate, 68 a cantilever beam and 70 a back gate.

DETAILED DESCRIPTION

Detailed descriptions of preferred embodiments of the present invention are provided below with respect to accompanying drawings. The structures or the electrical characteristic diagrams of exemplified devices in the accompanying drawings are provided to explain the technical idea of the present invention in order to understand a person with ordinary skill in the art to which the present invention pertains, thus, the technical idea of the present invention should not be restricted to the described embodiments herein.

Figure 5:
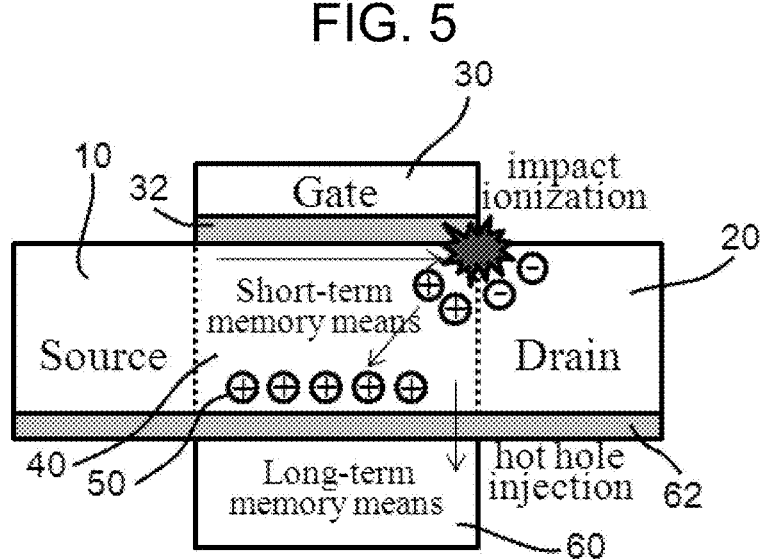
FIGS. 5 and 6 are a cross-sectional view of a synaptic semiconductor device according to one embodiment of the present invention to show that the carriers injected into a long-term memory means 60 by a time difference between pre- and post-synaptic spike signals are determined as holes or electrons.

A synaptic semiconductor device according to an embodiment of the present invention, as shown in FIG. 5, basically comprises: a floating body 40 as a short-term memory means formed of a first conductivity type (e.g., p-type) semiconductor material and electrically isolated from the surroundings; a source 10 and a drain 20 formed of a second conductivity type (e.g., n-type) semiconductor material opposite to the first conductivity type on both sides of the floating body 40 with being separated from each other; a gate 30 formed of a conductive material on a gate insulating layer 32 formed on the floating body 40; and a long-term memory means 60 formed at one side of the floating body 40 not formed of the source 10, drain 20 and gate 30.

Here, the floating body 40 temporally stores specific carriers to mimic a short-term memory, and so it is formed of a semiconductor material and has to be electrically isolated from the surroundings.

In order to electrically isolate from the surroundings, the floating body 40 can be diversely formed with detailed structures. First, the floating body 40 can be isolated from both sides contacted with the source 10 and drain 20 by a depletion region due to a pn junction by the different conductivity types and isolated from the other surroundings by forming an insulating or air-gap layer or by a noncontact mode. Of cause, the other surroundings except the source 10 and drain 20 can be also isolated by a depletion region of any pn junction with a surrounding semiconductor material.

Although the floating body 40 and the source 10 and drain 20 can be formed by the same semiconductor material or not, the same semiconductor substrate such as a silicon substrate can be used to have only the different conductivity types by implanting of impurities for forming source/drain as like as a conventional switching or memory device having a floating body.

Thus, the synaptic semiconductor device according to the present embodiment can be formed to n- and p-channel device structures.

And although the methods for injecting a specific carrier into the floating body 40 can be diverse, it is desirable that the excess holes generated by the impact ionization in a depletion region of the side of drain 20 in the n-channel device structure and the excess electrons generated by the impact ionization in a depletion region of the side of source 10 in the p-channel device structure are supplied, respectively.

The excess holes or electrons entering into the floating body 40 can be stored for a moment before disappearance by a recombination etc.

In the n-channel device structure, the excess holes stored in the floating body 40 can increase a body potential and drop the conduction band of floating body, which raise the conductivity of channel. As a result, until the excess holes have disappeared, it is possible to mimic the short-term memory of a biological synapse by the temporary high conductivity of channel.

On the other hand, in the p-channel device structure, the excess electrons stored in the floating body 40 can decrease the body potential and raise the valance band of floating body, which also raise the conductivity of channel. As a result, until the excess electrons have disappeared, it is possible to mimic the short-term memory of a biological synapse by the temporary high conductivity of channel.

The synaptic semiconductor device according to the present embodiment can further comprise a gate 30 and a long-term memory means 60 as well as the floating body 40 located in the center and the source 10/drain 20 formed on the both sides of the floating body 40.

The gate 30 is used to form a channel between the source 10 and drain 20 for generating the impact ionization at the side of drain 20 or source 10. Thus, the gate 30 is formed between the source 10 and drain 20 as shown in FIG. 5, and the gate 30 can be formed of the conductive material not only on the upper portion of the floating body 40, but also on any one side of or under the floating body 40 according to the shape of the floating body 40 being interlaid with a gate insulating layer 32.

And the long-term memory means 60 is formed on one side of the floating body 40 except the sides formed of the source 10, drain 20 and gate 30 and can make a transition from a short-term memory state to a long-term memory state by the carriers generated by an additional impact ionization in a depletion region of the side of drain 20 or source 10.

Here, the long-term memory state indicates a state that is maintaining high conductivity of channel by a continuous effect on the channel potential through the long-term memory means 60 although the excess holes or electrons stored in the floating body 40 have disappeared by a recombination etc. Thus, it can mimic the biological long-term memory.

Though the long-term memory means 60 can be variously embodied, some embodiments are described hereafter.

First, the long-term memory means 60 can be formed at an opposite side to the gate 30 being interlaid with the floating body 40.

For more detailed embodiments, as shown in FIG. 5, the gate 30 can be formed at the upper portion of the floating body 40 and the long-term memory means 60 can be formed at the lower portion of the floating body 40, but the opposite structure is also possible, namely, the gate 30 can be formed at the lower portion of the floating body 40 and the long-term memory means 60 can be formed at the upper portion of the floating body 40.

Furthermore, if the gate 30 is formed at one side of the floating body 40 connecting the source 10 and drain 20, the long-term memory means 60 can be formed at an opposite side to and the other side of the floating body 40.

As the mentioned above, because the long-term memory means 60 is formed on the opposite side of the gate 30 and the floating body 40 is interlaid between the gate 30 and the long-term memory means 60, the carriers generated by the impact ionization are stored in the floating body 40 for a moment to maintain the short-term memory state. Additionally, when the repeated impact ionizations are applied, it shows an advantage that the long-term memory state can be easily transited from the short-term memory state. The advantage will be described later.

Figure 7:
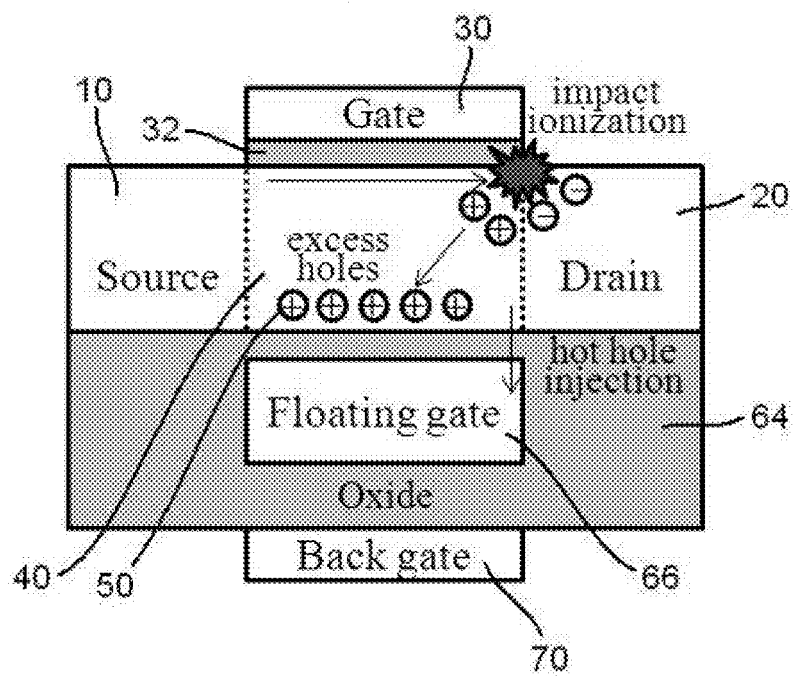
FIG. 7 is a cross-sectional view of a synaptic semiconductor device embodied by including a floating gate 66 as a long-term memory means 60 in FIG. 5 and a back gate 70 to show a transition of the long-term memory by the injection of hot holes generated by impact ionization into the floating gate 66.
Figure 17:
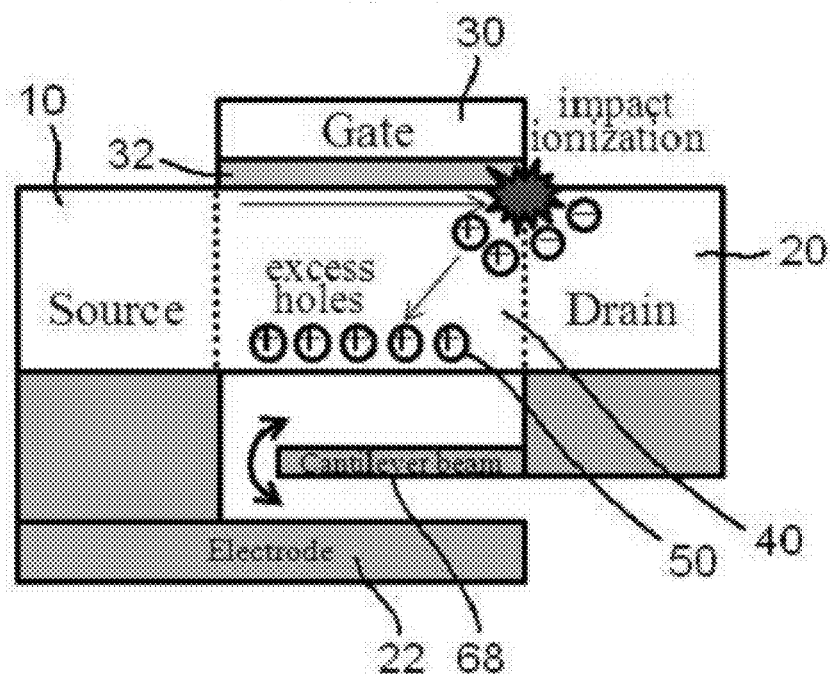
FIG. 17 is a cross-sectional view of a synaptic semiconductor device according to another embodiment implemented by an electro-mechanical memory device structure comprising a cantilever beam and a contact electrode for a long-term memory means 60 shown in FIG. 5.

The above mentioned long-term memory means 60 can be embodied by various carrier storage means etc., hereafter, embodiments embodied with carrier storage means such as a floating gate structure shown in FIG. 7 and an electro-mechanical memory device structure shown in FIG. 17 are described.

First, the long-term memory means 60, as shown in FIG. 7, can be embodied with a floating gate structure having a floating gate 66 formed on an insulating layer 64 contacted on the one side of the floating body 40. At this time, it is previously described that the location of the floating gate 66 is not restricted to a lower portion of the floating body 40.

And the floating gate 66 is able to store the hot holes or electrons generated by additional impact ionization and injected through an energy barrier of the insulating layer 64 for a long time without the worry of disappearance by a recombination etc. Thus, the floating gate 66 can be formed of not only a conductive material such as a semiconductor material doped with a high concentration of metals or impurities, but also a non-conductive material such as a nitride having many traps to be able to store the injected carriers.

FIG. 7, as a detailed embodiment of the long-term memory means 60, shows a floating gate structure comprising a floating gate 66 formed at a lower portion of the floating body 40 and wrapped around by the insulating layer 64 and a back gate 70 further formed at a lower portion of the floating gate 66 and interlaid with the insulating layer 64.

Because the back gate 70, as described later, is used to be able to easily inject the hot holes or electrons generated by the additional impact ionization into the floating gate 66 by applying a suitable bias voltage, the back gate 70 can be formed at one side of the floating gate 66 being interlaid with the insulating layer 64, even if the floating gate 66 is formed at an upper portion of or at any side of the floating body 40.

On the other hand, the long-term memory means 60, as shown in FIG. 17, can be embodied with an electro-mechanical memory device structure. It comprises a cantilever beam 68 electrically connected to any one of the source 10 and drain 20 through any one side among not only a lower portion of, but also an upper portion of or any side of left and right sides of the floating body 40, a contact electrode 22 electrically connected to the other one of the source 10 and drain 20, and an interval space interlaid between the cantilever beam 68 and the contact electrode 22.

By the electro-mechanical memory device structure used to embody the long-term memory means 60, the short-term memory and the short-long term memory transition of the biological synapse can be also mimicked.

First of all, in one embodiment having the electro-mechanical memory device structure, the short-term memory mimicry, as previously explained, is performed by using the channel conductivity effect of the excess holes (in case of an n-channel device, 50) or the excess electrons (in case of a p-channel device, not shown) generated by the impact ionization in a depletion region of the side of drain 20 or source 10 and stored in the floating body 40 for a moment to maintain until they have disappeared by a recombination etc.

And the short-long term memory transition mimicry is performed by using the flowing property of the electro-mechanical memory device.

Figure 18:
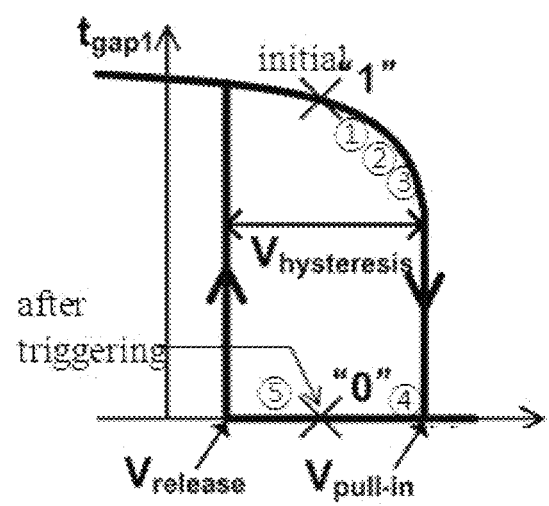
FIG. 18 is a hysteresis diagram explaining operation of the electro-mechanical memory device having the long-term memory means shown in FIG. 17.

In the structure shown in FIG. 17, by the repetitive stimulation, namely, when the bias voltage is repeatedly applied to the source 10 and drain 20, the excess holes or electrons generated by the additional impact ionization are flowed in the floating body 40. The concentration of the incoming carriers, as shown in FIG. 18, induces an electrostatic force to bend the cantilever beam 68 toward the contact electrode 20 (in FIG. 18, processed from an initial state "1" to states ①~③). If the concentration of the carriers is gradually increased to over a specific concentration, the full-in state ④ is obtained to electrically contact the cantilever beam 68 to the contact electrode 20.

By the way, the cantilever beam 68, as shown in FIG. 18, has a hysteresis property that is the maintenance of the pull-in state ④ until the voltage between the source 10 and drain 20 is dropped down to a predetermined release voltage $V_{release}$.

Thus, by the repetitive stimulation-induced additional impact ionization, the excess holes or electrons are flowed in the floating body 40 and the high electrostatic force is forced to once electrically contact the cantilever beam 68 to the contact electrode 20. It is possible to maintain the full-in state of the cantilever beam thereafter the electrical contact although the stimulation is not applied and all the carriers flowed in the floating body 40 have disappeared by a recombination etc. (e.g., at state ⑤ in FIG. 18). Therefore, since the high conductivity between the source and drain is continuously maintained, it is transited to the long-term memory state.

Because the hysteresis property of the cantilever beam 68 depends on the materials of cantilever beams. In order to more safely transit to the long-term memory state, a charge storage layer (not shown) can be further formed to be contacted with the floating body 40 and be interlaid between the floating body 40 and the cantilever beam 68. Thus, it is preferable to store the hot holes or electrons generated by the additional impact ionization in the charge storage layer as like as the floating gate structure.

Figure 1:
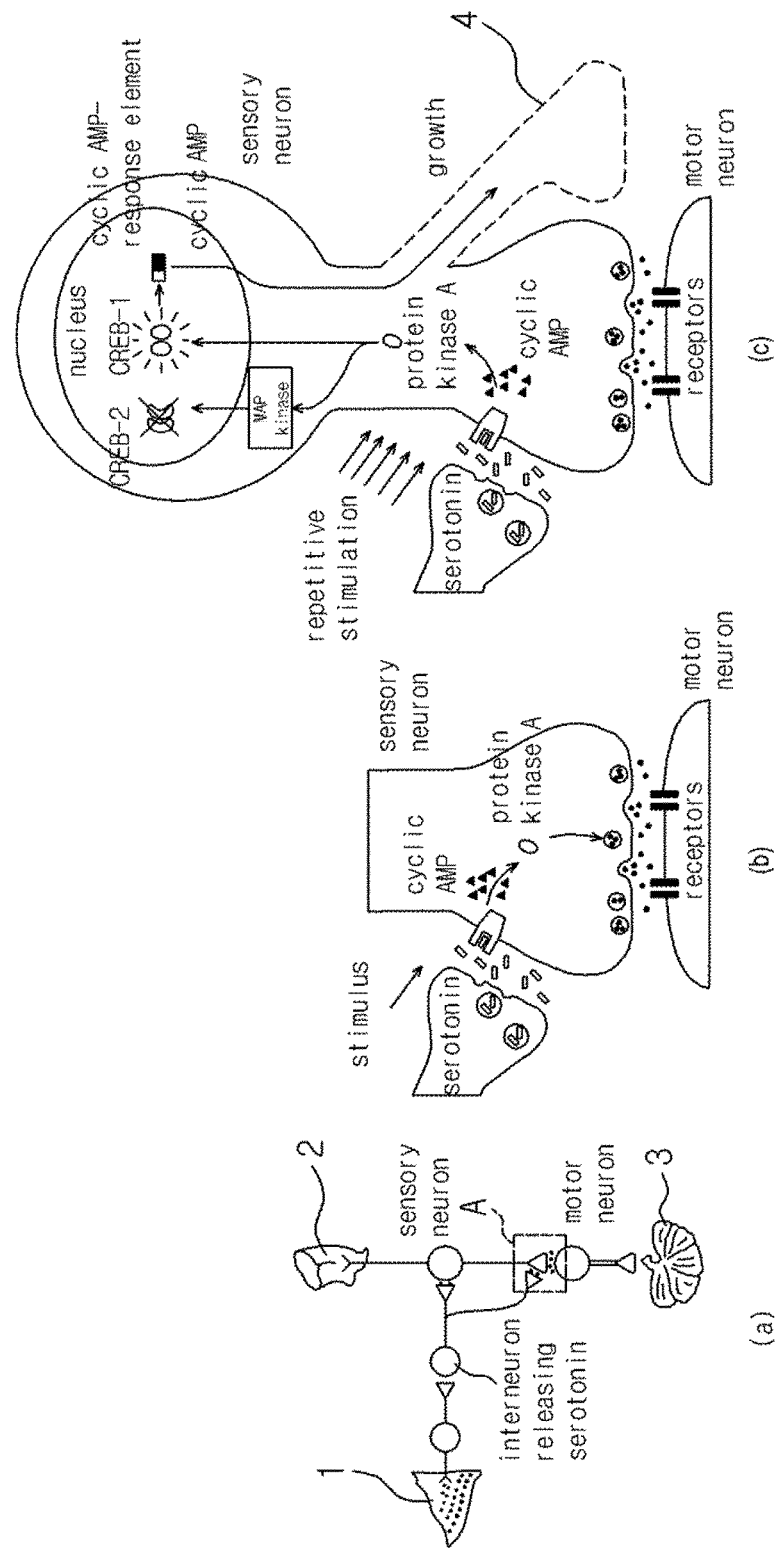
FIGS. 1 and 2, a redrawing of the drawings in "In Search of Memory" (Reference 1) written by Eric R. Kandel, are a diagram for showing a transition mechanism transited from a short-term memory to a long-term memory in a living body and for showing a long-term memory storage mechanism stored only in the stimulated synapse by new growth of synaptic terminals etc. corresponding to the effects of gene expression in the nucleus, respectively.
Figure 2:
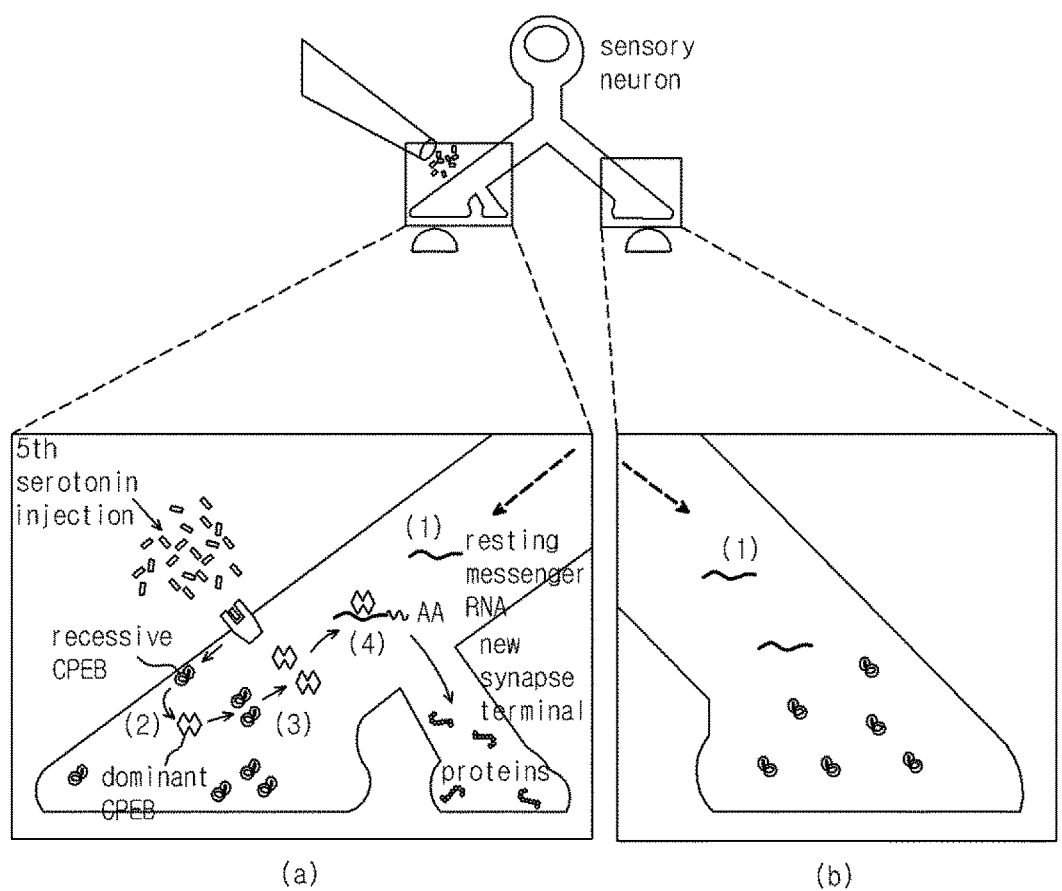
Figure 3:
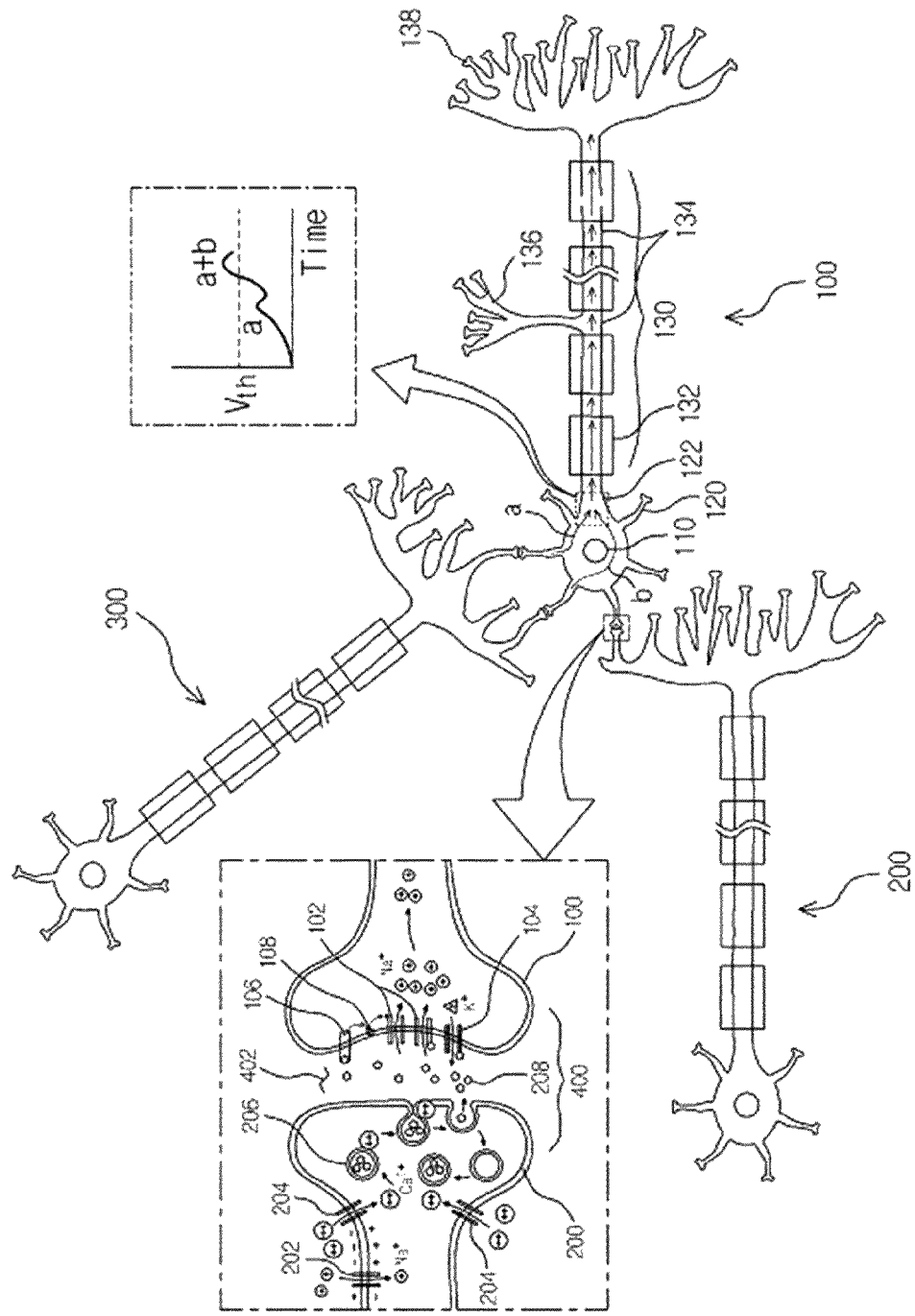
FIG. 3 is a diagram showing a single neuron connected to two neurons to explain a STDP property indicating the synaptic connectivity changed by a fire time difference between the pre- and post-synaptic neurons.

The mentioned synaptic semiconductor device according to the embodiment of the present invention is, as the enlarged view shown in FIG. 3, used to mimic a biological synapse 400 connecting a pre-neuron 200 and a post-neuron 100. Since it is assumed that the source 10 of the synaptic semiconductor device receives the electrical signals transferred to the axon terminal of pre-synaptic neuron 200 and the drain 20 receives the electrical signals transferred to and fired at the axon hillock 122 through the dendrite of the post-synaptic neuron 100, the neuromorphic computation system can be embodied by composing an array as a nerve network of the synaptic semiconductor devices mimicking the biological synapse.

The biological synapse 400 converts the electrical signals transferred to the axon terminal of the pre-synaptic neuron 200 to the chemical signals using the neurotransmitters, namely processing the short-term memory step, and produces the electrical signals by again firing at the axon hillock 122 through the dendrite of the post-synaptic neuron 100. The synaptic semiconductor device according to the present invention can mimic the short-term memory by the process of generating the excess holes or electrons corresponding to the neurotransmitters by the impact ionization in a depletion region of the side of drain 20 or source 10, storing the excess holes or electrons in the floating body, and maintaining the high conductivity of channel before the excess holes or electrons have disappeared by a recombination etc.

And when the biological synapse 400 receives the repetitive stimulation, the biological synapse 400 can be transited to the long-term memory by the morphological change at the stimulated region of the synapse such as the growth of a new synapse etc. The transition of the long-term memory can be naturally mimicked by the synaptic semiconductor device according to the present invention. In other words, as the repetitive stimulation the repetitive impact ionizations enable much more excess holes or electrons to flow in the floating body 40 for injecting the hot holes or electrons into the floating gate 66 or for contacting the cantilever beam 68 to the contact electrode 22. Although the carriers stored in the floating body 40 have disappeared by a recombination etc., the high conductivity of channel is maintained by the injected hot holes or electrons into the floating gate 66 or by the cantilever beam 68 electrically contacted to the contact electrode 22. Therefore, the long-term memory state can be mimicked by the synaptic semiconductor device according to the present invention.

Because the repetitive stimulation in the biological synapse 400 increases the quantity of cyclic AMP, for generating the repetitive impact ionization in the synaptic semiconductor device according to the present invention, it is preferable to apply the bias repeatedly before the disappearance of the excess holes or electrons by a recombination etc.

Figure 6:
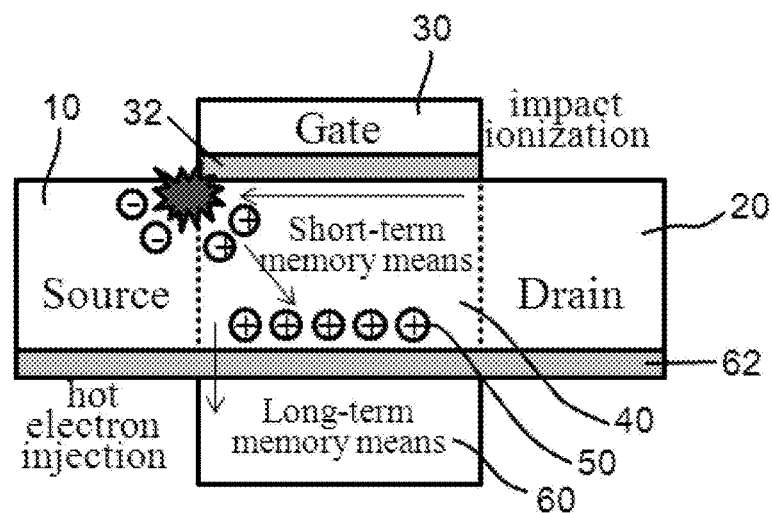

And the biological synapse 400 shows a causal inference property, namely, a property that is a potentiation or depression of the synaptic connectivity according to the fire time difference between pre- and post-synaptic neurons. The property can be easily mimicked by the time difference of the electrical signals independently applied to the source 10 and drain 20 in the synaptic semiconductor device according to the present invention. Although the detailed explanation about the property mimicry will be described later in the description of operation method of the synaptic semiconductor device, the causal inference property can be mimicked by the concept as shown in FIG. 6. Namely, if the high bias signals are applied to the drain 20 faster than the source 10, the hot electrons generated in a depletion region of the side of source 10 are entered into the long-term memory means 60 stored the holes for dropping down the channel conductivity. In this case, the synaptic connectivity is depression. On the contrary, if the high bias signals are applied to the source 10 faster than the drain 20, the synaptic connectivity is potentiation.

Therefore, the synaptic semiconductor device according to the present invention can mimic all of the short-term memory, the short-long term memory transition and the causal inference property of the biological synapse 400 and be also operated by the low power. Thus, the synaptic semiconductor device according to the present invention can be used as a core device to embody the neuromorphic computation system.

Next, with reference to FIGS. 8 to 16, operation methods of the synaptic semiconductor device according to the other feature of the present invention will be described.

Hereafter, for convenience of explanation, an operation method of the synaptic semiconductor device having an n-channel device structure shown in FIG. 7 will be described, but it is first declared that the below description can be applied with inference to an operation method of the synaptic semiconductor device having a p-channel device or the other structures.

Short-Term Memory Operation

In the synaptic semiconductor device having the n-channel device structure shown in FIG. 7, a short-term memory operation is performed by applying predetermined bias voltages to the source 10, drain 20, gate 30 and back gate 70 respectively to generate excess holes 50 by inducing the impact ionization in a depletion region of the side of drain 20 and to store the excess holes 50 in the floating body 40.

Here, the bias voltage applied to each terminal can be a potential difference from a common reference potential (e.g., GND).

Figure 4:
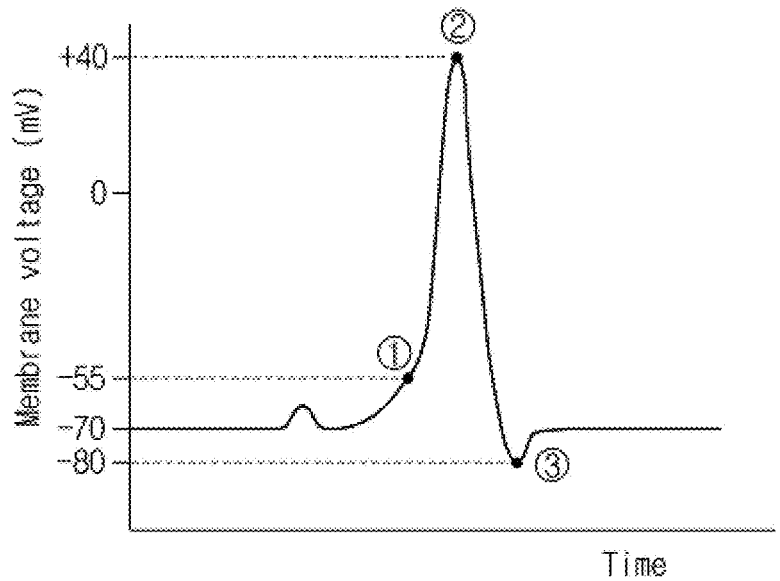
FIG. 4 is a diagram of a spike waveform showing a membrane potential change of a neuron.
Figure 13:
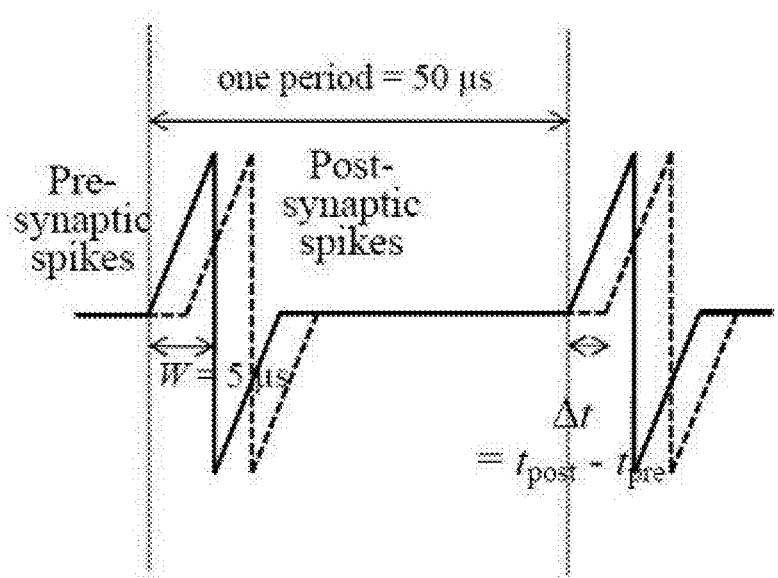
FIG. 13 is showing triangle spike waveforms applied to the source and drain respectively in FIG. 7. The source is applied by pre-synaptic spikes mimicking the electrical signals transmitted to axon terminals of the pre-synaptic neuron, the drain is applied by post-synaptic spikes mimicking the electrical signals fired at axon hillock and transferred from dendrites of the post-synaptic neuron. The pre- and post-synaptic spikes have respectively a predetermined duration (W=5 μs), are repeatedly applied with a predetermined period (50 μs) and have a predetermined delay time ($\Delta t = t_{post} - t_{pre}$) between them.

Especially, considering that the electrical signals transferred to the axon terminal of the pre-synaptic neuron 200 of the biological synapse 400 and the electrical signals fired at the axon hillock 122 of the post-synaptic neuron 100 are as like as a spike waveform as shown in FIG. 4, it is preferred that the bias voltages have a similar waveform to the mentioned above, such as a triangle spike waveform as shown in FIG. 13.

Figure 14:
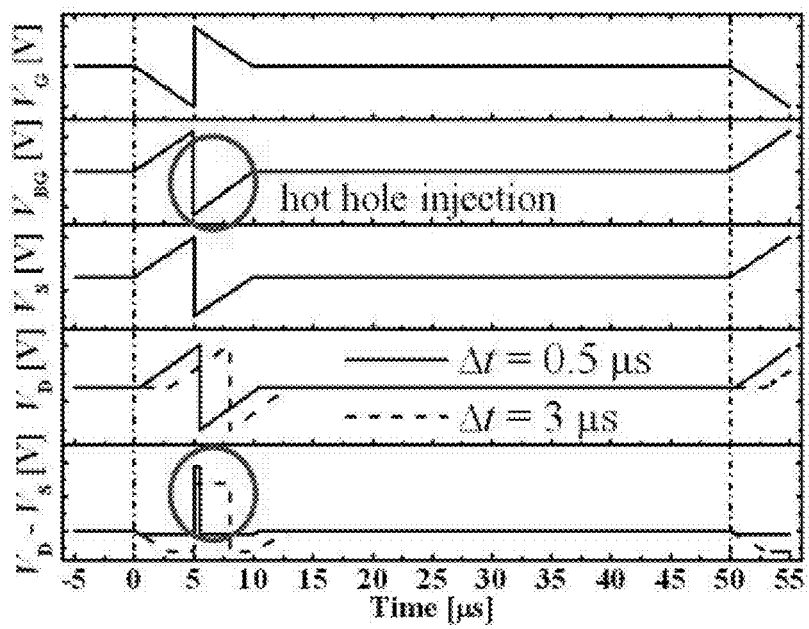
FIGS. 14 and 15 are showing whether a voltage (an operation pulse voltage, $V_D$-$V_S$) between the source and drain can induce an impact ionization or not and that it is possible to know whether the carriers generated by the impact ionization are holes or electrons by the time difference ($\Delta t$) between the pre- and post-synaptic spikes applied respectively to the source and drain, when each voltage ($V_D$, $V_S$, $V_{BG}$, $V_G$) with a triangle spike waveform is applied by a predetermined period to each terminal of the structure shown in FIG. 7.

To be more concrete, as shown in FIG. 14, the triangle spike waveforms applied to the source 10, drain 20 and back gate 70 are all the same size and the triangle spike waveform applied to the gate 30 can be increased or decreased according to the time and inversed to the triangle waveform applied to the back gate 70.

For the short-term memory, a single triangle spike waveform applied to each terminal is enough. But for the operation transited to the long-term memory, as described later, all triangle spike waveforms are repeated by the same predetermined period, as shown in FIG. 14.

Thus, as shown in FIG. 14, if each bias voltage is applied as the source voltage $V_S$ is applied 0.5 μs faster than the drain voltage $V_D$, the back gate voltage $V_{BG}$ is applied at the same time of the source voltage, and the gate voltage $V_G$ is applied to inversely increase and decrease, the source-drain voltage $V_D$-$V_S$ is a positive rectangle pulse voltage with 0.5 μs width, the gate voltage $V_G$ is a high positive value, and the back gate voltage $V_{BG}$ is a high negative value for the time of the rectangle pulse voltage being applied to source-drain. Therefore, a channel are formed along to the source 10 and drain 20 direction in the floating body 40 under the gate 30 and the electron-hole pairs are generated by the impact ionization in a depletion region of the side of drain 20.

From the electron-hole pairs generated by the impact ionization, the electrons are flowed out to the drain 20 and the holes are flowed into the floating body 40 to be stored as the excess holes 50.

Figure 8:
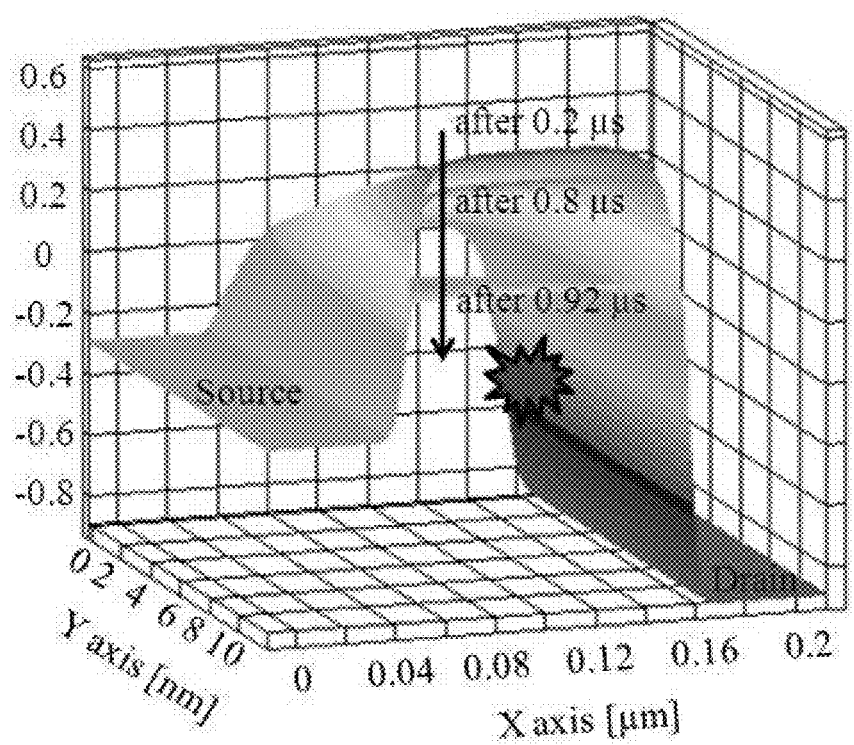
FIG. 8 is a simulation result view showing the change of minimum conduction band energy in the floating body along to the source/drain direction when duration of an input signal is increased to 0.2 μs, 0.8 μs and 0.92 μs under the same bias condition for generating the impact ionization at the side of a drain in the structure shown in FIG. 7.

As the mentioned above, when the excess holes 50 are accumulated and stored in the floating body 40, as shown in FIG. 8, the minimum conduction band energy is decreased in the source to drain direction of floating body 40. In consequence, the electrons are very well moved from the source 10 to the drain 20, and the conductivity of channel is increased.

Since the high conductivity of channel is only maintained during the storage of the excess holes 50 in the floating body 40, the conductivity of channel is returned to the original state by disappearance of the excess holes 50 through flowing out to around depletion regions etc. and recombining.

FIG. 8 is a simulation result view showing the change of minimum conduction band energy in the floating body 40 along to the source/drain direction when duration of an input signal is increased to 0.2 μs, 0.8 μs and 0.92 μs under the same bias condition for generating the impact ionization at the side of a drain in the structure shown in FIG. 7.

In FIG. 8, the duration of an input signal indicates the width of the source-drain rectangle pulse voltage mentioned above. Thus, the simulation results in FIG. 8 are obtained with the same size, but with the different width of the rectangle pulse voltage.

On the other hand, in FIG. 14, when the source voltage $V_S$ is applied 3 μs faster than the drain voltage $V_D$, the source-drain rectangle pulse voltage value is decreased. Thus, the generation of electron-hole pairs by the impact ionization at the side of drain 20 can be difficult.

Therefore, it is preferable that the source-drain rectangle pulse voltage has an enough size to generate the electron-hole pairs by inducing the impact ionization and the duration (a width of rectangle pulse voltage) of 0.5~1 μs. However, if the size and/or width of the source-drain rectangle pulse voltage are too increased, the operation power is too wasted. Thus, it is preferred to determine the source-drain rectangle pulse voltage according to the property of biological synapses to be mimicked.

Anyway, when a short-term memory operation according to this embodiment is performed, it is enough to apply a several voltage (e.g., 0.1~3V) for the duration of 0.5~1 μS. Thus, the low power operation is possible.

Short-Long Term Memory Transition Operation

Before the excess holes 50 flowed in the floating body 40 in the short-term memory operation have disappeared by a recombination etc., if the bias condition equal to the bias condition of the short-term memory is applied 2 or more times with a predetermined interval to the source 10, drain 20, gate 30 and back gate 70, respectively, hot holes are injected into the floating gate 66 and then the long-term memory is transited.

For this operation, the bias voltages applied to each terminal can have a waveform different from the waveform of voltage at the short-term memory operation, but for mimicking the biological environment shifted to the long-term memory by repeating the same stimulation, it is preferable to apply a waveform equal to the waveform applied at the short-term memory repeatedly with a predetermined period.

Especially, as shown in FIG. 14, it is preferable that the bias voltages applied to each terminal are all the same triangle spike waveforms and are repeated by the same predetermined period.

Figure 11:
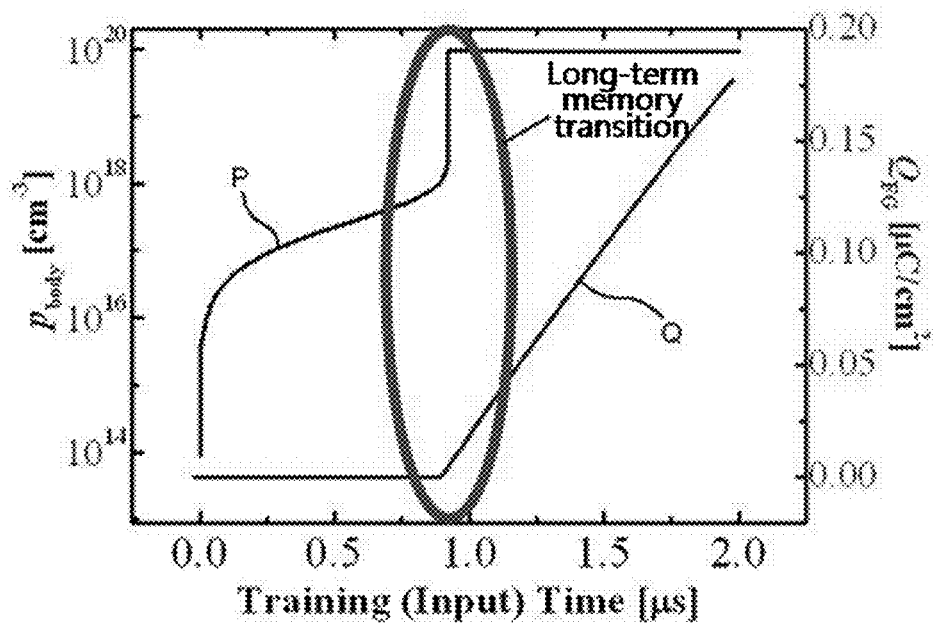
FIG. 11 is an electrical characteristic diagram showing a hole concentration (P) and a quantity of electric charge (Q) of the floating body 40 according to the duration of an input signal under the same bias condition as that for generating the impact ionization and showing that the triggering point beginning an increase of the quantity of electric charge (Q) of the floating gate, namely, the specific training time for the transition of the long-term memory can be identified and hereafter the hole concentration suddenly increased is maintained with a predetermined value, but the quantity of electric charge of the floating gate is continuously increased.

FIG. 11 is an electrical characteristic diagram showing a hole concentration (P) and a quantity of electric charge (Q) of the floating body 40 according to the duration of an input signal under the same bias condition as that for generating the impact ionization. From FIG. 11, the triggering point beginning an increase of the quantity of electric charge (Q) of the floating gate, namely, the specific training time for the transition of the long-term memory can be identified and hereafter it can be known that the hole concentration suddenly increased is maintained with a predetermined value, but the quantity of electric charge of the floating gate is continuously increased.

Total hole concentration of the floating body 40 at the triggering point of transiting from the short-term memory to the long-term memory is, as shown in FIG. 11, about $10^{18}/cm^3$. To meet the total hole concentration, there can be various operation embodiments. But, first of all, it can be operated by applying bias voltages to the source 10 and drain 20 with a different duration of each bias according to the size of voltage applied to the gate 30.

Here, the duration of each bias applied to the source 10 and drain 20, as shown in FIG. 13, indicates a time (W) with a positive value if a bias with a predetermined period and a triangle spike waveform is applied, and strictly indicates the time of generating the impact ionization.

In a detailed embodiment, if the signals of $V_G=1V$, $V_S=0.2V$, $V_D=0.8V$ and $V_{BG}=-2.5V$ are applied to, and after about 0.8 μs, it is transited to the long-term memory.

However, if the bias of $V_G$ is variously applied as $V_G=0.9$, 1.1 and 1.2V and the other terminals are maintained as the bias conditions equal to the above mentioned conditions, the duration of 15, 0.06 and 0.005 μs is needed to transit to the long-term memory, respectively.

And, as shown in FIG. 14, when the source-drain voltage $V_D$-$V_S$ is applied as a rectangle pulse voltage and the rectangle pulse voltage is repeated with a period shorter than the period for disappearance of the holes 50 stored in the floating body 40 by a recombination etc, it can be operated by the method of shortening the duration (a pulse width) and increasing the frequency (the number of times being applied) of the rectangle pulse voltage.

Additionally, for transiting from the short-term memory to the long-term memory, before the excess holes 50 flowed into the floating body 40 have disappeared by a recombination etc., it is needed to generate the impact ionization by repeating 2 or more times with a predetermined period.

Figure 12A:
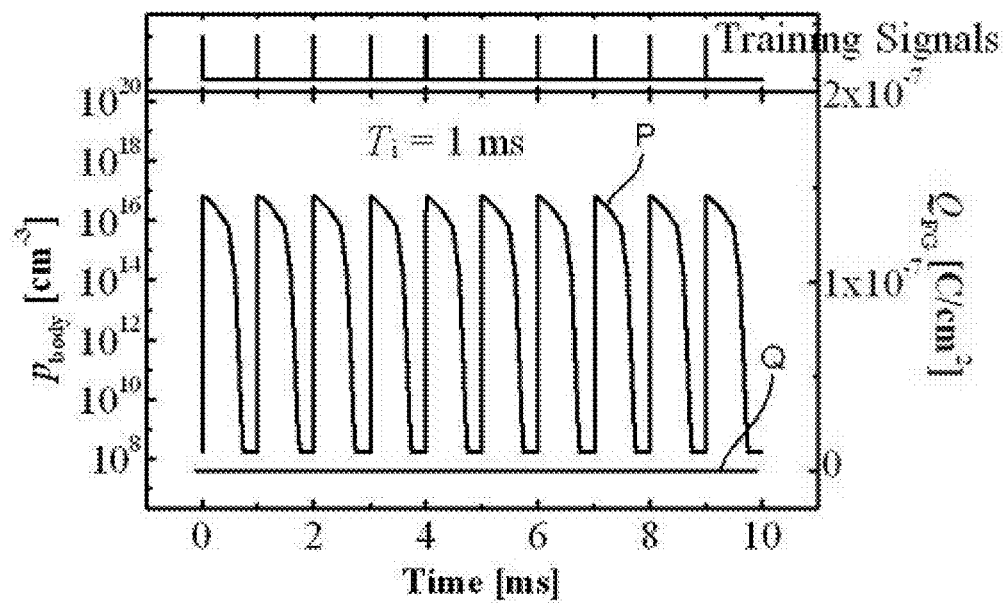
FIGS. 12A to 12C are electrical characteristic diagrams showing the excess hole concentration (P) and the quantity of electric charge (Q) of the floating gate according to the time change when an input signal (a pulse) is repeatedly applied with a specific period under the same bias condition for generating the impact ionization.

FIG. 12A shows that if the same bias condition is repeated 2 or more times by a time interval (period Ti=1 ms) for which the excess holes 50 flowed into the floating body 40 have disappeared by a recombination etc., though the short-term memory is much repeated, hot holes cannot be injected into the floating gate 66, and so the long-term memory cannot be transited (referred to P and Q shown in FIG. 12A).

Figure 12B:
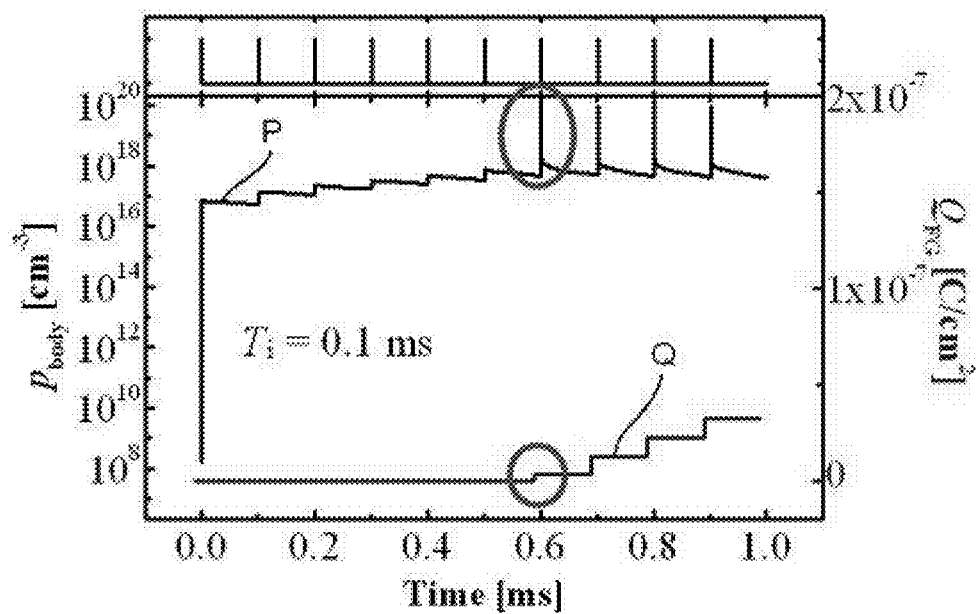
Figure 12C:
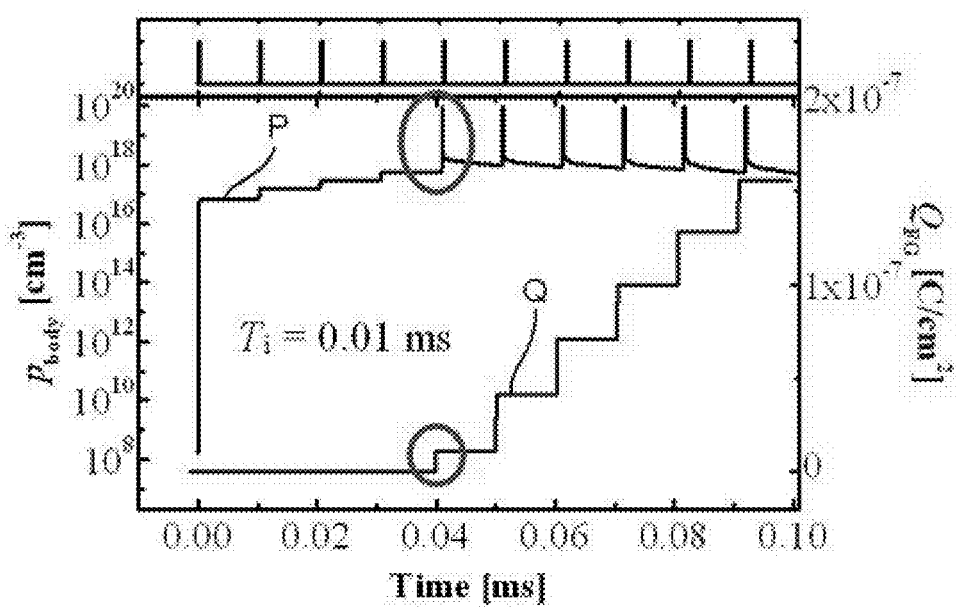

On the other hand, FIGS. 12B and 12C show that when the next impact ionization is induced under the same bias condition as FIG. 12A before the excess holes 50 flowed into the floating body 40 have disappeared by a recombination etc., the excess holes 50 are continuously accumulated, as shown in FIG. 11, to about $10^{18}/cm^3$ of total hole concentration of the floating body 40, then hot holes are injected into the floating gate 66, and the long-term memory is transited (referred to P and Q shown in FIGS. 12B and 12C).

And they show that under the same bias condition, the shorter the generation period of the impact ionization, the faster the time of transiting to the long-term memory.

FIG. 12B shows that when the period Ti is 0.1 ms, the time of transiting to the long-term memory is 0.6 ms for 6 times of the impact ionization. But FIG. 12C shows that when the period Ti is 0.01 ms, the time of transiting to the long-term memory is 0.04 ms for 4 times of the impact ionization.

Thus, as another embodiment for transition to the long-term memory, when the difference of voltages applied to the source 10 and drain 20, namely, the source-drain voltage $V_D$-$V_S$ and the duration for generating the impact ionization are equally maintained, it can be operated by changing the frequency (the number of times of the impact ionization generation or the stimulation) until when the long-term memory is transited according to the period (a stimulation period) or the triggering point of transition to the long-term memory.

As the mentioned above, through various methods, the short-long term memory transition operation can be performed by changing each bias condition or the condition of the waveform. Thus, it can mimic to meet the short-long term memory transition property of the biological synapse.

Next, the injection mechanism of hot holes into the floating gate 66 is briefly explained. When the holes generated by each impact ionization are flowed in and continuously accumulated, as shown in FIG. 11, to about $10^{18}/cm^3$ of total hole concentration of the floating body 40, the hot holes begin to be injected into the floating gate 66.

The reason is as follows: when the duration for generating the impact ionization under the same bias condition is increased to 0.2 μs, 0.8 μs and 0.92 μs, as shown in FIG. 8, the minimum conduction band of the floating body 40 between source 10 and drain 20 gradually descends according to the increase of holes in the floating body 40.

Figure 9:
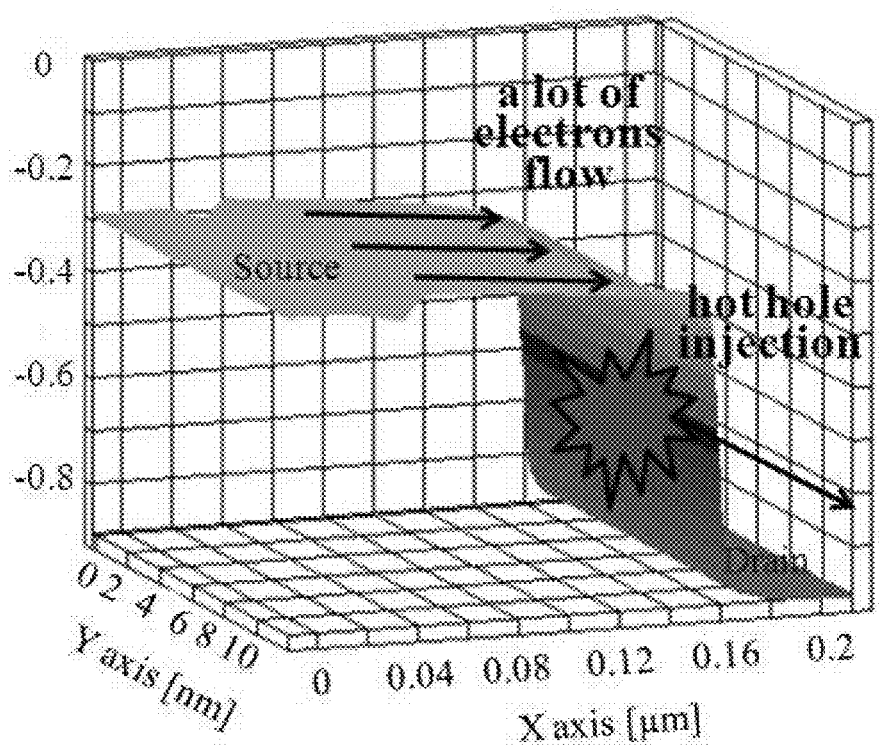
FIG. 9 is a simulation result view showing a descent of the generating point of the impact ionization from a substrate surface of the side of a drain to a floating gate 66 according to a lot of electron flow from a source to a drain by a descent of the minimum conduction band energy of the floating body when the input signal is given for 1 μs duration under the same bias condition as shown in FIG. 8.

Next, when the duration is increased to 1 μs, as shown in FIG. 9, the minimum conduction band of the floating body 40 more descends to increase the electron flow from the source 10 to the drain 20 and to lower the generation point of the impact ionization from the depletion region around the substrate surface of the side of drain 20 to the depletion region of the side of floating gate 66.

Consequently, the hot holes generated by the impact ionization induced in the depletion region of the floating body 40 at the side of floating gate 66 are injected into the floating gate 66 over the energy barrier of the insulating layer 64 under the floating body 40.

Here, when a negative voltage is applied to the back gate 70, the hot holes are easily injected into the floating gate 66.

Figure 10:
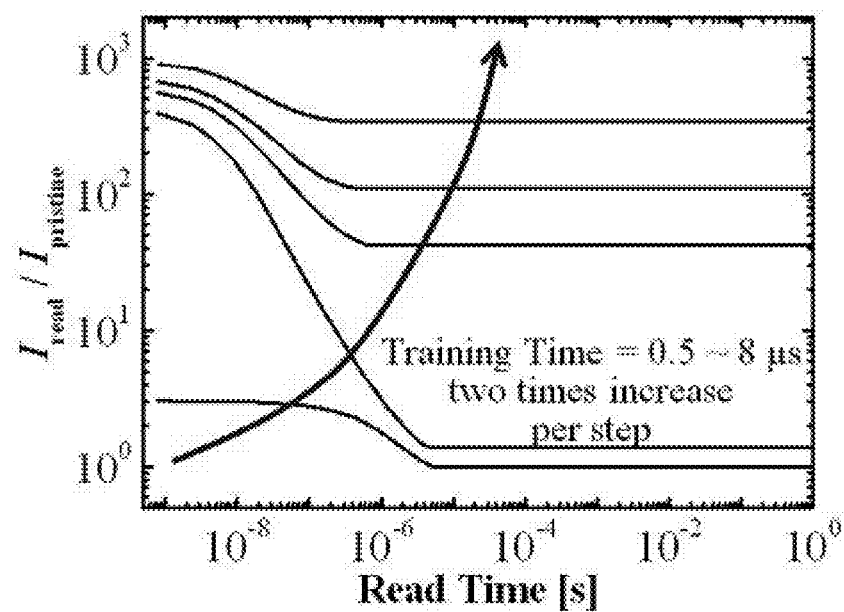
FIG. 10 is an electrical characteristic diagram showing a relative conductivity of a channel according to a read time measured after the duration (a training time) of the input signal only being increased by 2 times per step under the same bias condition for generating the impact ionization and showing the longer is the duration of the input signal, the higher is the steady state of a relative conductivity of a channel to make a transition to the long-term memory.

The hot holes injected into the floating gate 66 can be stored for a long time without the worry of disappearance by a recombination etc. and transited to the long-term memory state which is able to highly maintain the relative conductivity of channel. FIG. 10 shows that the longer is the training time for generating the impact ionization, the higher is the steady state of a relative conductivity ($I_{read}/I_{pristine}$) of a channel to make a transition to the long-term memory.

Therefore, when the long-term memory means 60 shown in FIG. 5 is formed, specifically, with the floating gate 66 in the structure shown in FIG. 7, it is advantageously formed on the opposite side of the gate 30 being interlaid with the floating body 40. In this case, the higher is the hole concentration stored in the floating body 40, the lower is the generation point of the impact ionization. Namely, the generation point descends from the depletion region around the substrate surface of the side of drain 20 to the depletion region of the side of floating gate 66. Thus, it shows an advantage that the hot holes generated by the impact ionization in the depletion region of the side of floating gate 66 is more easily injected into the floating gate 66, which makes a transition to the long-term memory naturally.

Living Body's Causal Inference Property Mimicry Operation

This operation basically uses the type change of carriers injected into the floating gate 66 according to the time difference of the electrical signals independently applied to the source 10 and drain 20, respectively.

For this operation, as explained above, it is considered that the electrical waveform of the biological stimulation is the spike waveform as shown in FIG. 4. Thus, it is preferable that the bias voltages (the electrical signals) applied to each terminal are one having a triangle spike waveform as shown in FIG. 13 similar to that of the biological stimulation.

Figure 15:
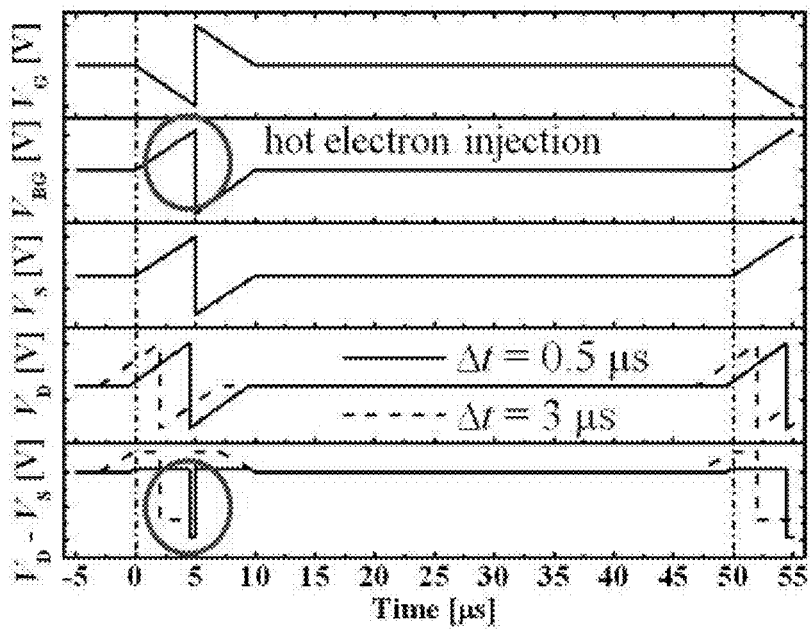

To be more concrete, as shown in FIGS. 14 and 15, the triangle spike waveforms applied to the source 10, drain 20 and back gate 70 have all the same size and the triangle spike waveform applied to the gate 30 is increased or decreased according to the time and is inversed to the triangle waveform applied to the back gate 70.

For more detailed operation, first, as shown in FIGS. 14 and 15, the source 10 and back gate 70 is applied with the same triangle spike waveform at the same time and, for the time applied to the source 10, the gate 30 is applied with a voltage having a waveform equal to that applied to the back gate 70 but being inversely increased or decreased according to the time.

As the mentioned above, in the state that the source 10, gate 30 and back gate 70 are applied with the triangle spike waveform voltage, respectively, as shown in FIG. 14, when the drain voltage $V_D$ having the triangle spike waveform equal to that applied to the source 10 is applied at the time delayed by a predetermined time (e.g., 0.5 μs) from the time applied to the source voltage $V_S$, the source-drain voltage $V_D$-$V_S$ comes to be a positive rectangle pulse voltage having a width of a predetermined time (0.5 μs).

For the time the positive rectangle pulse voltage is applied between source and drain, the gate voltage $V_G$ has a high positive value and the back gate voltage $V_{BG}$ has a high negative value. As shown in FIG. 5, the hot holes generated by the impact ionization in the depletion region of the side of drain 20 are injected into the floating gate 66 and then added to the stored holes to more raise the conductivity of channel. Thus, it is operated as a potentiation of the synaptic connectivity.

On the contrary, as shown in FIG. 15, in the state that the source 10, gate 30 and back gate 70 are intactly maintained with bias voltages applied as before, when the drain voltage $V_D$ having the triangle spike waveform equal to that applied to the source 10 is applied at a predetermined time (e.g., 0.5 μs) faster than that applied to the source, the source-drain voltage $V_D$-$V_S$ comes to be a negative rectangle pulse voltage having a width of a predetermined time (0.5 μs).

For the time the negative rectangle pulse voltage is applied between source and drain, the gate voltage $V_G$ has a high negative value and the back gate voltage $V_{BG}$ has a high positive value. As shown in FIG. 6, the hot electrons generated by the impact ionization in the depletion region of the side of source 10 are injected into the floating gate 66 and then reduce the stored hole concentration to decrease the conductivity of channel. Thus, it is operated as a depression of the synaptic connectivity.

Therefore, if the triangle spike waveform applied to the source 10 is the pre-synaptic spike and the triangle spike waveform applied to the drain 20 is the post-synaptic spike, by using the time difference between the triangle spike waveforms independently applied to the source and drain as the delay time between the pre- and post-synaptic spikes, the living body's causal inference-property, namely, the STDP property of biological nervous system due to the potentiation or depression of the synaptic connectivity can be mimicked.

Figure 16:
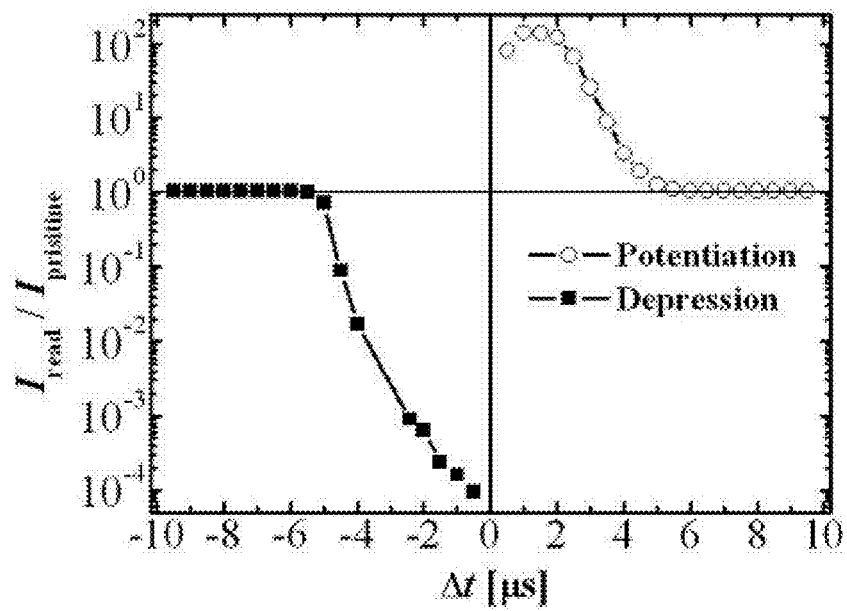
FIG. 16 is an electrical characteristic diagram showing the relative conductivity of channel measured according to the time difference ($\Delta t$) between the pre- and post-synaptic spikes applied to the source and drain, respectively, in the structure shown in FIG. 7. The STDP property of a biological nervous system, namely, the potentiation or depression of the synaptic connectivity can be mimicked.

FIG. 16 is an electrical characteristic diagram showing the relative conductivity ($I_{read}/I_{pristine}$) of channel measured according to the time difference Δt as a delay time between the pre- and post-synaptic spikes applied to the source and drain, respectively, in the structure shown in FIG. 7. It shows that the potentiation or depression of the synaptic connectivity as the STDP property in the biological nervous system can be well mimicked.

Here, the time difference Δt which is the delay time between pre- and post-synaptic spikes is the difference between the post-synaptic spike application time $t_{post}$ and the pre-synaptic spike application time $t_{pre}$.

In case of Δt>0, it means that the post-synaptic spike is applied later than the pre-synaptic spike. Because the relative conductivity ($I_{read}/I_{pristine}$) of channel is increased when both signals are applied within a predetermined time, it shows that the potentiation of synaptic connectivity of the biological nervous system can be well mimicked.

And in case of Δt<0, it means that the post-synaptic spike is applied earlier than the pre-synaptic spike. Because the relative conductivity ($I_{read}/I_{pristine}$) of channel is reduced when both signals are also applied within a predetermined time, it shows that the depression of synaptic connectivity of the biological nervous system can be well mimicked.

The described operation method of the synapse-semiconductor device, as mentioned above, is mainly explained on the n-channel device having the structure shown in FIG. 7. In case of a p-channel device, it can be explained that the excess holes and hot holes generated by the impact ionization of the side of drain are substituted for the excess electrons and hot electrons generated by the impact ionization of the side of source, respectively.

And among the words used in this description, the carrier indicates an electron or hole that can make a current (a flow of charges), the excess hole and electron respectively indicate a hole and electron that exists in a state higher than a heat balance state (a neutral state), and the hot hole and electron respectively indicate a hole and electron that has an energy level to get over the energy barrier of an insulating layer around the channel.

What is claimed is:

1. A synaptic semiconductor device comprising:
   a floating body as a short-term memory means formed of a first conductivity type semiconductor material and electrically isolated from the surroundings;
   a source and a drain formed of a second conductivity type semiconductor material opposite to the first conductivity type on both sides of the floating body with being separated from each other;
   a gate formed of a conductive material on a gate insulating layer formed on the floating body; and
   a long-term memory means formed at one side of the floating body not formed of the source, drain and gate.

2. The synaptic semiconductor device of claim 1, wherein the long-term memory means is formed at an opposite side to the gate being interlaid with the floating body.

3. The synaptic semiconductor device of claim 2, wherein the long-term memory means includes an insulating layer formed on the one side of the floating body and a floating gate formed on the insulating layer.

4. The synaptic semiconductor device of claim 3,
   wherein the floating gate is formed at a lower portion of the floating body,
   wherein the insulating layer is formed to wrap around the floating gate, and
   wherein a back gate is further formed on the insulating layer at a lower portion of the floating gate.

5. The synaptic semiconductor device of claim 1, wherein the floating body has pn junctions with the source and drain and is operated to mimic a short-term memory by storing excess holes generated by an impact ionization in a depletion layer of the pn junction at the side of the drain or excess electrons generated by an impact ionization in a depletion layer of the pn junction at the side of the source and by disappearance of the excess holes or electrons by a recombination.

6. The synaptic semiconductor device of claim 5, wherein the floating body is operated to shift to a long-term memory by inflow of excess holes or electrons generated by an additional impact ionization to further reduce the conduction band or raise the valance band before the disappearance of the excess holes or electrons by a recombination and by allowing that the impact ionization is generated near to the long-term memory means.

7. The synaptic semiconductor device of claim 6,
wherein the long-term memory means includes an insulating layer formed on the one side of the floating body and a floating gate formed on the insulating layer,
wherein the long-term memory occurs by injection of hot holes or electrons generated by an additional impact ionization into the floating gate when the additional impact ionization is generated near to the long-term memory means, and
wherein the long-term memory means is operated to mimic a causal inference property of a living body by the hot carriers injected into the floating gate due to the time difference between the electrical signals independently applied to the source and drain, respectively.

8. The synaptic semiconductor device of claim 2, wherein the long-term memory means has an electro-mechanical memory device structure that includes a cantilever beam and a contact electrode electrically connected to one and the other of the source and drain respectively and spaced apart from each other at the one side of the floating body.

9. The synaptic semiconductor device of claim 8, wherein the floating body has pn junctions with the source and drain and is operated to mimic a short-term memory by storing excess holes generated by an impact ionization in a depletion layer of the pn junction at the side of the drain or excess electrons generated by an impact ionization in a depletion layer of the pn junction at the side of the source and by disappearance of the excess holes or electrons by a recombination.

10. The synaptic semiconductor device of claim 9, wherein the floating body is operated to shift to a long-term memory by inflow of excess holes or electrons generated by an additional impact ionization to curve the cantilever beam for electrically contacting to the contact electrode over a predetermined concentration before the disappearance of the excess holes or electrons by a recombination.

11. The synaptic semiconductor device of claim 2, wherein the floating body has pn junctions with the source and drain and is operated to mimic a short-term memory by storing excess holes generated by an impact ionization in a depletion layer of the pn junction at the side of the drain or excess electrons generated by an impact ionization in a depletion layer of the pn junction at the side of the source and by disappearance of the excess holes or electrons by a recombination.

12. The synaptic semiconductor device of claim 11, wherein the floating body is operated to shift to a long-term memory by inflow of excess holes or electrons generated by an additional impact ionization to further reduce the conduction band or raise the valance band before the disappearance of the excess holes or electrons by a recombination and by allowing that the impact ionization is generated near to the long-term memory means.

13. The synaptic semiconductor device of claim 12,
wherein the long-term memory means includes an insulating layer formed on the one side of the floating body and a floating gate formed on the insulating layer,
wherein the long-term memory occurs by injection of hot holes or electrons generated by an additional impact ionization into the floating gate when the additional impact ionization is generated near to the long-term memory means, and
wherein the long-term memory means is operated to mimic a causal inference property of a living body by the hot carriers injected into the floating gate due to the time difference between the electrical signals independently applied to the source and drain, respectively.

14. The synaptic semiconductor device of claim 3, wherein the floating body has pn junctions with the source and drain and is operated to mimic a short-term memory by storing excess holes generated by an impact ionization in a depletion layer of the pn junction at the side of the drain or excess electrons generated by an impact ionization in a depletion layer of the pn junction at the side of the source and by disappearance of the excess holes or electrons by a recombination.

15. The synaptic semiconductor device of claim 14, wherein the floating body is operated to shift to a long-term memory by inflow of excess holes or electrons generated by an additional impact ionization to further reduce the conduction band or raise the valance band before the disappearance of the excess holes or electrons by a recombination and by allowing that the impact ionization is generated near to the long-term memory means.

16. The synaptic semiconductor device of claim 15,
wherein the long-term memory means includes an insulating layer formed on the one side of the floating body and a floating gate formed on the insulating layer,
wherein the long-term memory occurs by injection of hot holes or electrons generated by an additional impact ionization into the floating gate when the additional impact ionization is generated near to the long-term memory means, and
wherein the long-term memory means is operated to mimic a causal inference property of a living body by the hot carriers injected into the floating gate due to the time difference between the electrical signals independently applied to the source and drain, respectively.

17. The synaptic semiconductor device of claim 4, wherein the floating body has pn junctions with the source and drain and is operated to mimic a short-term memory by storing excess holes generated by an impact ionization in a depletion layer of the pn junction at the side of the drain or excess electrons generated by an impact ionization in a depletion layer of the pn junction at the side of the source and by disappearance of the excess holes or electrons by a recombination.

18. The synaptic semiconductor device of claim 17, wherein the floating body is operated to shift to a long-term memory by inflow of excess holes or electrons generated by an additional impact ionization to further reduce the conduction band or raise the valance band before the disappearance of the excess holes or electrons by a recombination and by allowing that the impact ionization is generated near to the long-term memory means.

19. The synaptic semiconductor device of claim 18,
wherein the long-term memory means includes an insulating layer formed on the one side of the floating body and a floating gate formed on the insulating layer,
wherein the long-term memory occurs by injection of hot holes or electrons generated by an additional impact ionization into the floating gate when the additional impact ionization is generated near to the long-term memory means, and
wherein the long-term memory means is operated to mimic a causal inference property of a living body by the hot carriers injected into the floating gate due to the time difference between the electrical signals independently applied to the source and drain, respectively.

20. An operation method of the synaptic semiconductor device according to claim 4, comprising:
- operating a short-term memory by storing excess holes or electrons generated by an impact ionization in the floating body when predetermined bias voltages being applied to the source, drain, gate and back gate, respectively,
- operating a transition of a long-term memory by injecting hot holes or electrons into the floating gate when the bias voltages being applied to the source, drain, gate and back gate more than twice with a regular time interval under the same bias condition before disappearance of the excess holes or electrons by a recombination, and
- operating a mimicry of a causal inference property of a living body by the types of carriers injected into the floating gate according to the time difference between the electrical signals independently applied to the source and drain, respectively.

21. The operation method of claim 20, wherein the operation of the transition of the long-term memory is performed by the different duration of each of the bias voltages applied to the source and drain according to the size of voltage applied to the gate.

22. The operation method of claim 20, wherein the operation of the transition of the long-term memory is performed by equally maintaining the difference and the duration of the bias voltages applied to the source and drain and by changing the number of times according to the period.

23. The operation method of claim 20, wherein the bias voltages applied to the source, drain, gate and back gate are triangle spike waveforms having all the same period.

24. The operation method of claim 23,
- wherein the triangle spike waveforms applied to the source, drain and back gate have the same size, and
- wherein the triangle spike waveform applied to the gate is increased or decreased according to the time and is reversed to the triangle spike waveform applied to the back gate.

25. The operation method of claim 24,
- wherein the triangle spike waveform applied to the source is a pre-synaptic spike, the triangle spike waveform applied to the drain is a post-synaptic spike,
- wherein the pre- and post-synaptic spikes is to operate for transition from the short-term memory to the long-term memory through a predetermined repeat with a predetermined duration and a predetermined period, and
- wherein the mimicry of the causal inference property of a living body is operated by the potentiation or the depression of the synaptic connectivity using a delay time between the pre- and post-synaptic spikes.

26. The operation method of claim 21, wherein the bias voltages applied to the source, drain, gate and back gate are triangle spike waveforms having all the same period.

27. The operation method of claim 26,
- wherein the triangle spike waveforms applied to the source, drain and back gate have the same size, and
- wherein the triangle spike waveform applied to the gate is increased or decreased according to the time and is reversed to the triangle spike waveform applied to the back gate.

28. The operation method of claim 27,
- wherein the triangle spike waveform applied to the source is a pre-synaptic spike, the triangle spike waveform applied to the drain is a post-synaptic spike,
- wherein the pre- and post-synaptic spikes is to operate for transition from the short-term memory to the long-term memory through a predetermined repeat with a predetermined duration and a predetermined period, and
- wherein the mimicry of the causal inference property of a living body is operated by the potentiation or the depression of the synaptic connectivity using a delay time between the pre- and post-synaptic spikes.

29. The operation method of claim 22, wherein the bias voltages applied to the source, drain, gate and back gate are triangle spike waveforms having all the same period.

30. The operation method of claim 29,
- wherein the triangle spike waveforms applied to the source, drain and back gate have the same size, and
- wherein the triangle spike waveform applied to the gate is increased or decreased according to the time and is reversed to the triangle spike waveform applied to the back gate.

31. The operation method of claim 30,
- wherein the triangle spike waveform applied to the source is a pre-synaptic spike, the triangle spike waveform applied to the drain is a post-synaptic spike,
- wherein the pre- and post-synaptic spikes is to operate for transition from the short-term memory to the long-term memory through a predetermined repeat with a predetermined duration and a predetermined period, and
- wherein the mimicry of the causal inference property of a living body is operated by the potentiation or the depression of the synaptic connectivity using a delay time between the pre- and post-synaptic spikes.

* * * * *